United States Patent [19]

Kuster

[11] Patent Number: 5,379,950
[45] Date of Patent: Jan. 10, 1995

[54] METHOD AND SYSTEM FOR CONTROLLING A LAYER THICKNESS IN A GRINDING OPERATION

[75] Inventor: Werner Kuster, Niederuzwil, Switzerland

[73] Assignee: Bühler AG, Uzwil, Switzerland

[21] Appl. No.: 144,638

[22] Filed: Oct. 27, 1993

[30] Foreign Application Priority Data

Dec. 19, 1992 [DE] Germany .............. 4243262

[51] Int. Cl.$^6$ .................... B02C 4/32; B02C 9/04
[52] U.S. Cl. .................... 241/30; 241/34; 241/36; 241/37; 241/159
[58] Field of Search .............. 241/29, 30, 33, 34, 241/35, 36, 37, 158, 159

[56] References Cited

U.S. PATENT DOCUMENTS

| 801,259 | 10/1905 | Neumann | 241/159 X |
|---|---|---|---|
| 2,545,921 | 3/1951 | Goodwillie et al. | 241/37 X |
| 3,010,663 | 11/1961 | Bosshard | 241/36 |
| 3,292,869 | 12/1966 | Beyeler | 241/37 |
| 3,445,070 | 5/1969 | Verdier | 241/37 |
| 3,600,747 | 8/1971 | McCarty | 241/37 X |
| 4,603,815 | 8/1986 | Ripani et al. | 241/36 |
| 4,746,070 | 5/1988 | Kuster . | |
| 5,072,887 | 12/1991 | Thom, Jr. | 241/37 |

FOREIGN PATENT DOCUMENTS 3153304 3/1983 Germany .
3707745 9/1988 Germany .

Primary Examiner—Timothy V. Eley
Attorney, Agent, or Firm—Martin A. Farber

[57] ABSTRACT

A method is described for controlling the grinding of a dispersion of solid particles in a doughy-pasty mass, such as a chocolate mass, on a roller mill line having at least one preceding and one postponed roller mill (1 or 4), of which at east the postponed roller mill (4) is a roll refiner mill with a plurality of rollers (W1–W5). In this arrangement, the outlet roller gap of the preceding roller mill (1) is changed for decreasing or increasing the layer thickness of the mass in the postponed roller mill (4) having at least three rollers. Additionally and besides changing the outlet roller gap of the preceding roller mill (1) a control of the layer thickness of the postponed roller mill (4) is carried out according to a proportional-integral-differential control system. In doing so, the layer thickness can be measured on the postponed roller mill (4) within predetermined limits, with a change-over to the control system of the preceding roller mill (1) taking place upon exceeding these limits due to the difference of the actual thickness to the nominal layer thickness.

19 Claims, 3 Drawing Sheets

METHOD AND SYSTEM FOR CONTROLLING A LAYER THICKNESS IN A GRINDING OPERATION

FIELD OF THE INVENTION

The invention relates to a method for controlling the grinding of a dispersion of solid particles in a doughy-pasty mass, such as a chocolate mass, on a roller mill line having a least one preceding and one postponed roller mill, of which at least the postponed roller mill is a roll refiner mill with a plurality of rollers, in which arrangement the outlet roller gap of the preceding roller mill is changed for decreasing or increasing the layer thickness of the mass in the postponed roller mill having at least three rollers.

BACKGROUND OF THE INVENTION

Such a method has become known from the DE-A-37 07 745. Since the respective preceding roller mill has to process coarser particles, it is to be understood that a control in the coarse range can thus be carried out relatively well. On the other hand, it will also be understood that due to the path from the preceding roller mill to the postponed one, the recovery time constant is relatively great. In practice there will therefore result a sort of proportional-integral-characteristic. This relatively long recovery time constant possibly causes deviations from the nominal value of the particle size to remain unstabilized for a relatively long time.

Now, the DE-C-31 53 304 shows a way how the grinding gap of a multi-roll mill, as the postponed roller mill will generally be, can be controlled over the axial length of the rollers in a relatively troublefree manner, e.g. according to a proportional-differential-characteristic, with respect to the control behavior and the uniformity of the gap adjustment or the layer thickness resulting therefrom. This control takes place by adjusting the number of rotations of the feed-in roller shaft in dependence upon the layer thickness measured. However, it has to be taken into account that also the feed-in rollers accomplish a grinding power. Therefore, when changing the introduction of energy into the mass, the flow characteristics will also be changed, particularly the flow limits, which, in the case of chocolate, may ultimately also affect the conching time. In the literature of the prior art, the phenomenon has been mentioned that chocolate masses which apparently have been processed in a completely uniform way and have the same composition of substances, may yield differing qualities after the conching. For this reason, regular flow characteristics of the material, particularly of cocoa mass or chocolate, brought about by controlling the roller speed on the basis of the differing specific energies introduced into the mass, will lead to different results, which is undesirable with a view to holding constant the quality. The entire contents of this DE-C- shall be incorporated herein by reference.

SUMMARY OF THE INVENTION

It is now an object of the present invention to provide a product being of a quality as uniform as possible, which object is achieved in accordance with the invention by providing—in addition to and besides changing the discharge roller gap of the preceding roller mill—a control of the layer thickness of the postponed roller mill according to a proportional-integral-differential control system.

In a further modification of the invention it is suggested that the layer thickness on the postponed roller mill should be controlled within predetermined limits, and to switch over to the control of the preceding roller mill if these limits should be exceeded due to the difference of the actual layer thickness and the nominal layer thickness. By choosing such a procedure, it will be achieved in an advantageous manner that the changes of the flow characteristics of the material brought about by changes of the grinding energy introduced into the postponed roller mill will remain within very narrow limits.

Furthermore, it is suggested in accordance with the invention that for controlling the layer thickness of the postponed roller mill the rotational speed of at least one feed-in roller of the postponed roller mill should be changed. This procedure contributes in a most simple way to an optimum control of layer thickness.

According to a further embodiment of the invention it is suggested that in a postponed roller mill having at least four rollers the rotational speed of the second feed-in roller should be changed, with the range of change for the control of layer thickness effected by changing the rotational speed, being selected at the most at a ratio of 1:3, preferably of 1:2.5 up to 1:2.75. These measures also contribute to manufacture a product of a quality being as uniform as possible.

To carry out the method it is suggested in accordance with a preferred embodiment of the invention that in the case of a plant with a roller mill line having a least one preceding and one postponed roller mill, of which at least the postponed roller mill is designed as a roll refiner mill with floating rollers and of which rollers at least one roller, in particular the feed-in roller, is connected to a driving mechanism controllable in its rotational speed, with a sensor for measuring the layer thickness being assigned to the postponed roller mill; that a comparator for the output signal of the layer thickness sensor and for a signal assigned to a predetermined layer thickness, whose output signal is applied via a switching stage, should be provided at least directly for controlling the rotational speed of the feed-in roller of the postponed roller mill of a motor control stage for a driving motor of the feed-in roller and/or for controlling a variable speed motor for the gap adjustment of at least two rollers of the preceding roller mill; that the output signal of the comparator should also be applied to a threshold switch having two switching thresholds, in particular to a window discriminator, and that the output signal of the threshold switch should be provided for controlling the switching stage. If the method provided by the invention is carried out by means of this plant, this will result in a uniform processing of sensitive masses, such as a cocoa mass, so that—in the case of correspondingly uniform conching conditions in the succeeding refining procedure—the reproducibility of formulations will be improved in a distinct manner.

According to a further embodiment of the invention an effective and economical adaptation to the masses to be processed can be achieved by providing the switching thresholds of the window discriminator in a functional interrelationship with the limit values of the control range of the postponed roller mill.

According to a further embodiment of the invention it is provided to have a variable speed motor be preceded by a control stage to which the output signal of the comparator is applied via a differentiating stage. In this way, the recovery time constant can be shortened in a simple manner.

An especially precise control can be accomplished in accordance with a further preferred embodiment of the invention by assigning a speed counter to the feed-in roller of the postponed roller mill, the output signal of which speed counter is confined with the output signal of the comparator for determining the control range of the postponed roller mill via a preferably programmable computing unit.

To adapt the limit value or the control range it is suggested in a further modification of the plant provided by the invention that at least one temperatur sensor should be assigned to the postponed roller mill, whose output signal is provided at least for changing the number of rotations of one or several feed-in rolleres.

In the case of certain materials it may be advantageous to provide both on the inlet side and on the outlet side of the postponed roller mill a respective temperatur sensor, with the output signals of the temperature sensors being applied to a differential amplifier, whose output signal can be used at least directly for determining the control signal for the driving motor or variable speed motor. On the basis of this arrangement, it is possible to preset a desired temperature and, in the case of a deviation of the measured temperatures, to decrease or increase the control range for the postponed roller mill.

According to the technical requirements the electronic stages or the relevant circuits can be designed as analogous or digital units.

BRIEF DESCRIPTION OF THE DRAWINGS

Other details of the invention will result from the following description of embodiments schematically shown in the drawings, with each of the FIGS. 1–3 representing a circuit diagram provided by the invention.

DETAILED DESCRIPTION OF THE DRAWINGS

Figure 1:
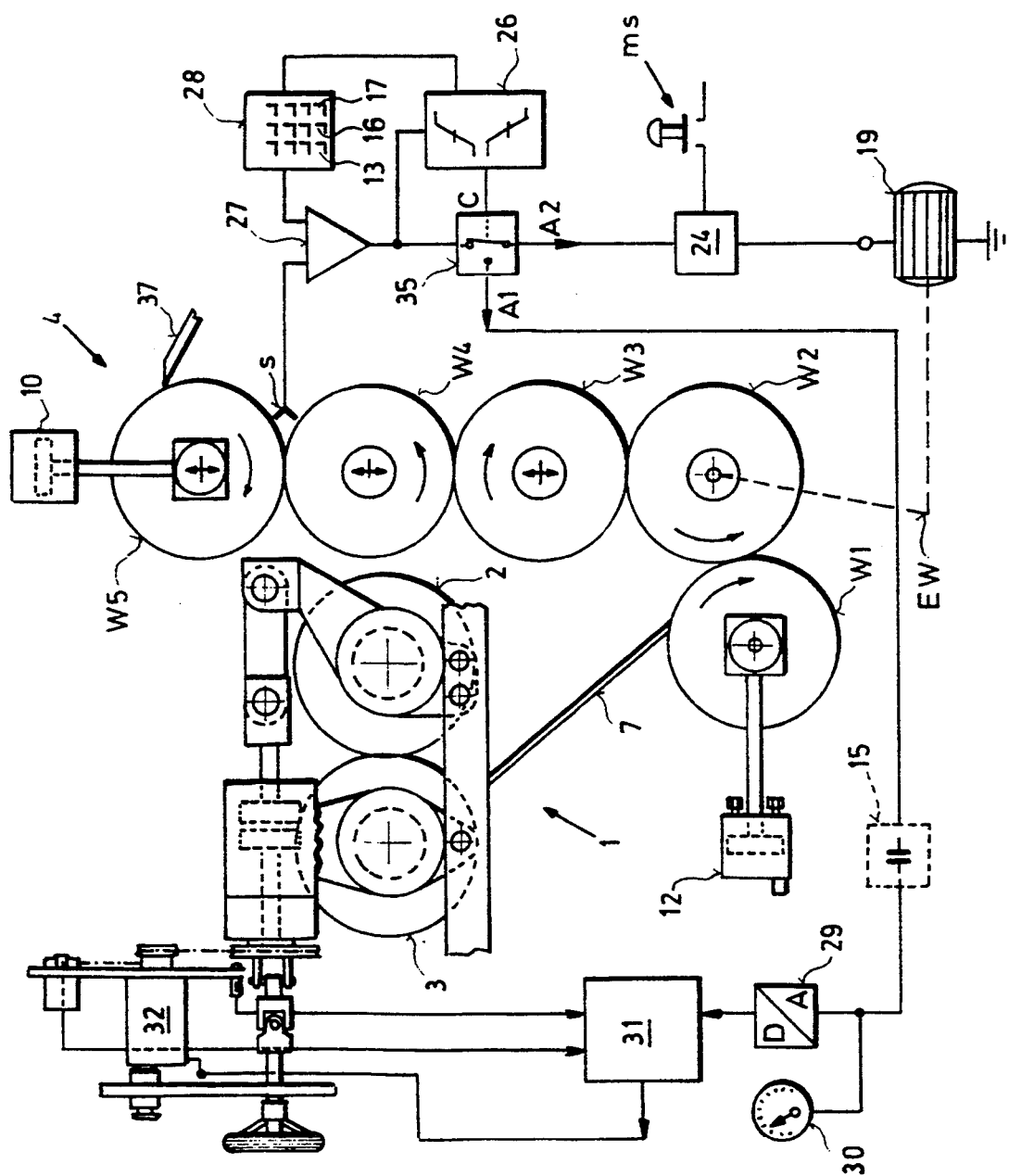

FIG. 1 substantially corresponds to the FIG. 1 of the DE-A-37 07 745, the entire contents of which are incorporated herein by reference. Therefore, it will be unnecessary to go into the details of this known control system. To understand the present invention it is essential to know that a preceding roller mill 1 and a postponed roller mill 4 are provided and that in the case of the roll refiner mill 4 having at least 4 floating rollers pressed against each other by pressure units 10, 12 (the roller W1 is thereby pressed against the stationary roller W2, as are the rollers W3 to W5) the number of rotations of the feed-in roller shaft EW can be adjusted in dependence upon the layer thickness measured toward the roller mill outlet.

It may be mentioned here that the feed-in roller shaft EW does not necessarily have to be connected to the roller W2, but that it can also be connected to the roller W1, and that is is also possible to interconnect the two rollers W1, W2 by means of a gear unit. Furthermore, the layer thickness, which decreases in proportion to the steadily increasing number of rotations of the rollers toward the last roller W5, can be measured on each of these rollers W1 to W5, in principle, even though a sensor s is indicated here between the fourth and the fifth roller W4 or W5.

The output signal of this sensor s is now applied to a comparator stage, e.g. in the form of a differential amplifier 27, whose other input lies on a set-point adjuster 28. This set-point adjuster is designed as a keyboard, by way of example, which also comprises a series of selection keys 13, 16 and 17. On activating the selection key 13 the set nominal value input via the other keys is fed to the comparator 27, whereas the selection keys 16 and 17 serve to adjust switching thresholds for a threshold switch 26 in the form of a window discriminator to be described later on.

The output of the comparator 27 is applied to a change-over stage 35 comprising the two outputs A1 and A2 as well as a control input C. The control input C is connected to the previously mentioned threshold switch 26, which has an upper and a lower switching threshold, as indicated by symbols. These two switching thresholds form tolerance limits within which the output signal of the comparator 27 is led to a motor control stage 24 for the driving motor 19 of the respective feed-in roller W2, which is put into operation as soon as a main switch ms for the roller mill 4 is closed. Even if only one single current line is shown in each figure, it is to be understood that at least the main switch ms will generally switch a threephase line for a threephase current.

However, if the output signal of the comparator 27 should exceed the limits defined by the threshold switch 27 or fall below them, that is, if it is more positive than the upper switching threshold or more negative than the lower switching threshold of this threshold switch 26, then the switching stage 35 is switched from the output A2 to the output A1 via its control signal input C in order to apply the control signal, e.g. via an analog digital converter 29, to a motor control stage 31 for a variable speed motor 32 for the gap adjustment of at least two rollers 2 and 3 of the preceding roller mill 1, and to control it in the respective opposite sense in a manner known from the DE-A-37 07 745.

Within the scope of the invention it is well possible to design the switching stage 35 as a distributor in such a way that even on switching on the output A1 the maximum or minimum signal allowed to pass through the threshold stage 26, or a signal lying in-between these two values, is still applied to the stage 24. Moreover, it may be convenient to apply a differentiating stage 15 to the output A1 in order to shorten the recovery time constant in this way. If a preceding and a postponed roller mill are mentioned here, these roller mills do not necessarily have to immediately follow each other; on the contrary, two roller mills can be chosen from a series of succeeding roller mills of a line for the control system according to the invention. However, it will be preferred to have the two roller mills immediately succeed each other.

As already mentioned, the switching thresholds or the threshold values of the threshold switch 26, e.g. for different materials or qualities, can be adjusted by the set-point adjuster 28 by pressing the selection key 16 for the upper threshold value and the selection key 17 for adjusting the lower threshold value.

Figure 2:
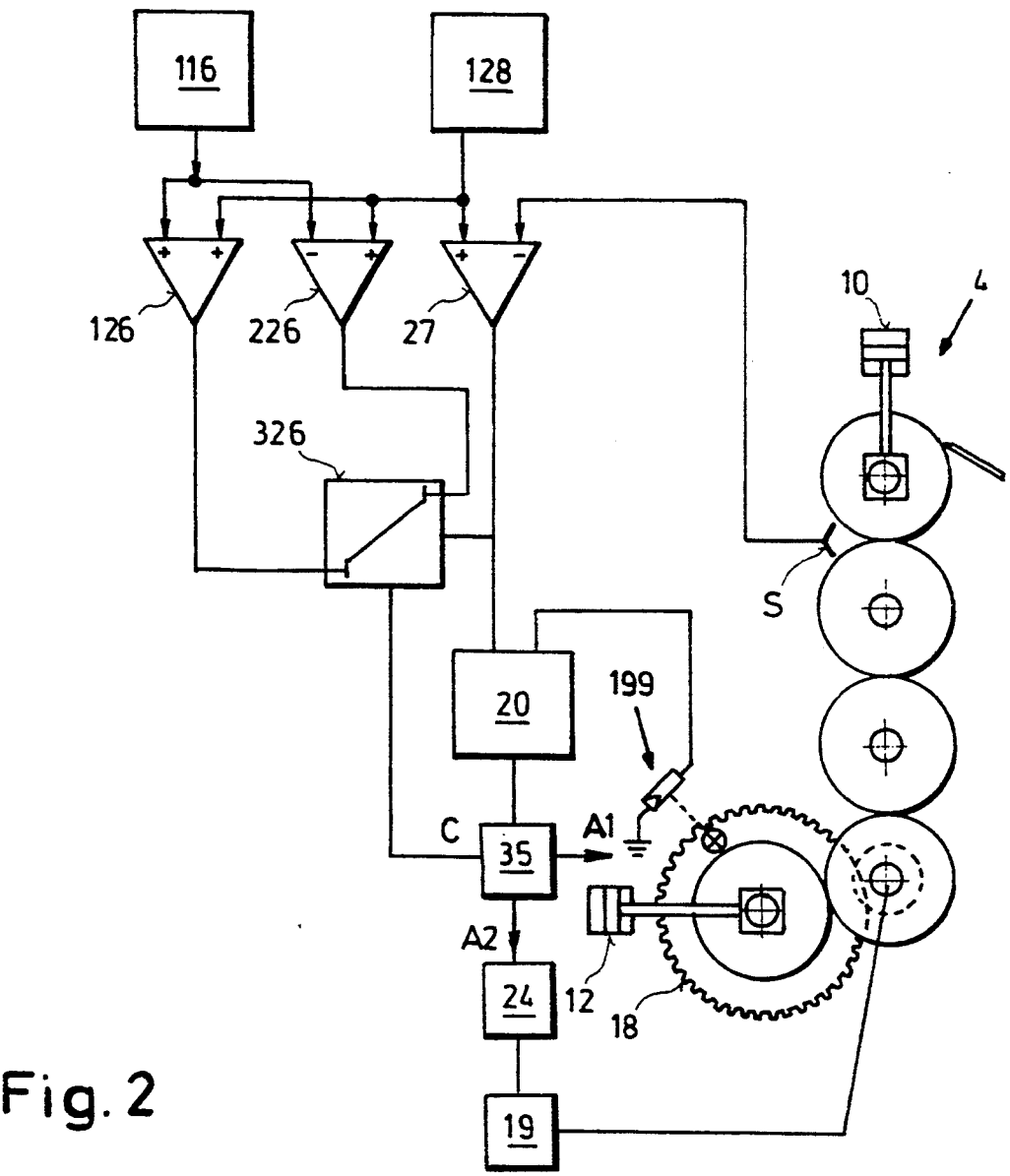

In the case of the embodiment according to FIG. 2, it may be started—for reasons of simplicity—from a roller mill 4 according to FIG. 1, whereas the preceding roller mill is not represented but can be designed in accordance with FIG. 1. In this embodiment as well as in FIG. 3, parts having the same function as in FIG. 1 have the same reference numerals; parts of merely similar functions still have the same reference numerals, however, complemented by hundreds digits.

According to FIG. 2 the output signal of the sensor s is applied to the comparator 27, as in the foregoing embodiment, whose other input is connected to a set-point adjuster 128. When using such an arrangement, the nominal value does not necessarily have to be constant, but can be changed, if desired, in the sense of an adaptive control system, if required, e.g. according to a program.

However, the output signal of the set-point adjuster 128 is also applied to a positive input of a respective operational amplifier 126, 226. The respective other input of each of these operational amplifiers 126, 226 is connected to an adjuster 116, which presets a value for the tolerance limit. This value is added to the nominal value from the set-point adjuster 128 by the operational amplifier 126 for forming the upper limit value for the control range of the motor 19, on the other hand, it is subtracted by the other operational amplifier 226 for forming the lower limit value for controlling the motor 19.

The limit values thus obtained are then applied to a bipolar limiter 326, whose output signal is compared, on the one hand, to the ACTUAL number of rotations of the feed-in roller W1, which, in this case, is in a stable speed ratio with the feed-in roller W2 via a toothed gearing. For measuring the number of rotations any sensor can be provided per se, for example a light barrier 199 flashing through the spacewidths of the toothed wheel 18. The output signals of this light barrier 199, whose frequency is a measure for the ACTUAL number of rotations of the feed-in rollers, are applied to a computing unit 20, which delivers a corresponding control signal. At the same time, the switching and distributing stage 35 can again be provided, which uses the control signal in the manner described above either for controlling the roller mill 1 or the roller mill 4 or both of them. Alternatively, the computing unit or processor 20 can carry out itself a corresponding signal distribution.

Figure 3:
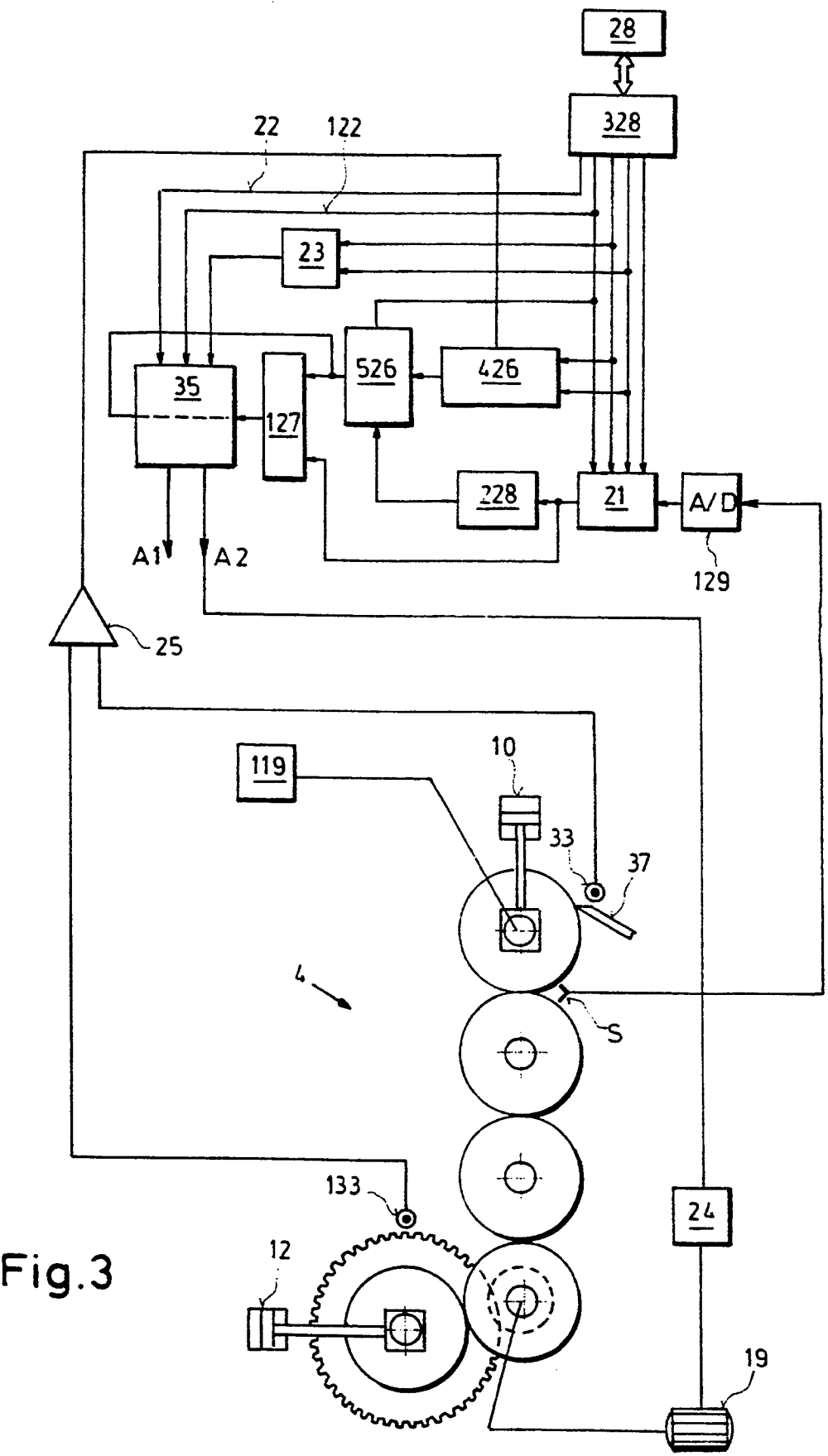

Also in the case of FIG. 3 only the roller mill 4 is represented, however, having a mere digital signal processing in this particular case. In this arrangement, the sensor s first delivers its output signal to an analog digital converter 129, from which the now digitalised signals are applied to an intermediate memory 21 for the moment. This intermediate memory 21 can be used selectively either for applying the ACTUAL values measured by the sensor s, or other parameters, if required, such as the number of rotations of the respective feed-in roller, to a stage 426, on the one hand, practically performing the tasks of the stages 126 and 226 of FIG. 2 and delivering a respective signal to an adding-subtracting or limiting stage 526, which functionally may substantially correspond to the stage 326 of FIG. 2.

On the other hand, the intermediate memory 21 can also be connected to a set-point memory 228 in order to read in during preparatory trials for different masses such ACTUAL values which are assessed as an optimum for a determined mass. The change-over takes place via a control unit 328 connected to an input device 28 (cf. FIG. 1) and which switches from reading in to reading out the values contained in the memory 228, with the values read in as ACTUAL values being still corrigible via the keyboard, if necessary.

If the reference memory 228 is switched into read-out operation, the ACTUAL values measured and thereafter digitalised by the sensor s are passed to the comparator 127 already known from the previous embodiments, but structured digitally in this particular arrangement, whose output is connected to the outputs A1 and A2 via the switching stage 35. This switching stage 35 is again controlled via the threshold switch or limit value transmitter 426, whose values can be adjusted via the stages 28, 328, for which purpose the control stage 526 comprises appropriate selection switches not shown here. If required, however, the switching stage 35 can also be switched directly via lines 22, 122 by the control unit 28, 328. A clock generator 23 is also connected to stage 35, as well as to others of the stages shown in a manner not represented.

A further control system becomes apparent from FIG. 3, which may be advantageous in this connection: At the outlet of the roller mill 4 there is provided a temperature sensor 33 within the range of a doctor blade 37, measuring the initial temperature of the mass. If desired, a second temperature sensor 133 may be provided on the inlet side of the roller mill 4, so that the temperature difference established by a differential amplifier 25 can be regarded as a measure of the grinding energy introduced by the roller mill. But since it has already been mentioned that the rheological characteristics of the mass are critical, particularly with respect to the efficiency of a succeeding conching process, but also with a view of the efficiency of the grinding procedure, a sensor 33 may possibly be sufficient. However, it may be mentioned that the grinding energy introduced can also be determined via the current intake or another performance parameter of the motor(s) of the roller mill(s), so that also this parameter can be used in addition or alternatively for controlling in a circuit in the manner of the circuit of the sensor 33.

At any rate the limit value, and thus the control range in which a change of the number of rotations of the respective feed-in roller (and/or of any parameter for changing the gap width between the rollers W1 to W5, such as the pressure applied by the aggregates 10, 12 and/or of the roller temperature affected by a cooling control not shown) is effected, can be controlled by the output signal of the sensor 33 directly or indirectly via the comparator 25. For example, a desired temperature can be preset and, in the case of exceeding temperatures of the ACTUAL temperature, the control range for the postponed roller mill can be rendered more narrow, and vice versa.

In general, the range of change for the layer thickness is not supposed to exceed a ratio of 1:3, which is valid particularly for the number of rotations of the rollers. A ratio of 1:2.75 to 1:2.5 or a yet smaller ratio, if required, is preferred.

What is claimed is:

1. A method for grinding and homogenizing material in the form of a dispersion of particles and pasty viscous material, including chocolate, comprising the steps of
treating said material at least in a first and in a second roller set, wherein said first roller set has at least two cooperating end rolls with an exit gap in between said end rolls, and said second roller set is a distributing roller set with at least three distributing rollers and at least one feed-in roller for feeding said material into said second roller set,
adjusting said exit gap, controlling said layer thickness by adjusting said distribution roller set wherein said controlling is made by a proportional, integral differential control system, and measuring an actual layer thickness, and wherein said controlling of said layer thickness is applied within a thickness range of said actual layer thickness in between preset upper and lower thickness values by adjusting said distribution roller set, whereas for an actual thickness outside said thickness range, said layer thickness is adjusted by said first roller set.

2. A method for grinding and homogenizing material in the form of a dispersion of particles and pasty viscous material, including chocolate, comprising the steps of treating said material at least in a first and in a second roller set, wherein said first roller set has at least two cooperating end rolls with an exit gap in between said end rolls, and said second roller set is a distributing roller set with at least three distributing rollers and at least one feed-in roller for feeding said material into said second roller set, adjusting said exit gap, and controlling said layer thickness by adjusting said distribution roller set wherein said controlling is made by a proportional, integral differential control system, and said controlling of said layer thickness includes adjusting the speed of at least one of said at least one feed-in rollers.

3. Method as claimed in claim 2, wherein said distributing roller set comprises, in the order of a passing of material by said distributing rollers, at least a first, a second, a third and a fourth distributing roller, and said speed adjusting takes place at said second distributing roller.

4. Method as claimed in claim 3, wherein said adjusting further takes place at said first distributing roller.

5. Method as claimed in claim 2, wherein said speed adjusting at at least one feed in roller is limited to a speed range with an upper and a lower speed limit allowing a corresponding thickness range with a ratio between the limits of said corresponding thickness range of at most 3:1.

6. Method as claimed in claim 5, wherein said ratio is in the range of 2.5:1 to 2.75:1.

7. A system for grinding and homogenizing material in the form of a dispersion of particles and pasty viscous material, including chocolate, comprising at least a first and a second roller set wherein, said first roller set has at least two cooperating end rolls with an exit gap in between said end rolls, and said second roller set is a distributing roller set with at least three distributing rollers and at least one feed in roller for feeding said material into said second roller set, motor means for driving at least one distribution roller with an adjustable speed, at least one thickness sensor for measuring an actual layer thickness of said material at said distribution roller set, comparator means connected to said at least one thickness sensor for receiving at least one first signal representing said actual layer thickness, with said comparator means receiving a second signal representing a predetermined layer thickness and comparing at least said first with said second signal and creating an comparator output signal, control means connected to said comparator means and to said motor means for controlling said adjustable speed of at least one distribution roller, a threshold switching means connect to said comparator means and to said control means for activating and deactivating said controlling of said adjustable speed according to the actual level of said comparator output signal.

8. System as claimed in claim 7, wherein said distribution roller driven with an adjustable speed is a feed-in roller.

9. System as claimed in claim 7, further comprising gap adjusting means connected to said control means and to said first roller set for adjusting said exit gap to said actual thickness wherein said gap adjusting is activated and deactivated by said threshold switching means.

10. System as claimed in claim 9, wherein said threshold switching means is a window discriminator which activates said speed adjusting when said layer thickness is within a thickness range in between preset upper and lower thickness values and which activates said gap adjusting means when said thickness is outside said thickness range.

11. System as claimed in claim 10, wherein said upper and lower thickness values are functionally dependent on an adjustable speed range with an upper and a lower speed limit of at least one distribution roller.

12. System as claimed in claim 9, wherein said gap adjusting means comprises gap motor means for positioning said at least two cooperating end rolls at variable distances, a differentiator for differentiating said comparator output signal gap control means receiving a differentiated output signal from said differentiator and controlling said gap motor means.

13. System as claimed in claim 9, further comprising a speed counter for measuring the speed of said feed in roller, computing means for inputting a speed signal from said speed counter and combining said speed counter signal with said comparator output signal and thereby deducing an adjustable speed range.

14. System as claimed in claim 13, wherein said computing means is programmable.

15. System as claimed in claim 9, further comprising at least one energy parameter sensor for measuring a parameter depending on the applied grinding energy, said measured energy parameter being used for controlling the speed of at least one feed-in roller.

16. System as claimed in claim 15, wherein said at least one energy parameter sensor is a first temperature sensor.

17. System as claimed in claim 16, further comprising a second temperature sensor, said first temperature sensor being located at the input end and said second temperature sensor being located at the output end of said second roller set, a differential amplifier for inputting the temperature signals of said first and second temperature sensors and for outputting a differential temperature signal which is used for said controlling of said adjustable distributing roller speed.

18. System as claimed in claim 16, further comprising a second temperature sensor, said first temperature sensor being located at the input end and said second temperature sensor being located at the output end of said second roller set, a differential amplifier for inputting the temperature signals of said first and second temperature sensors and for outputting a differential temperature signal which is used for said adjusting said exit gap.

19. A system for grinding and homogenizing material in the form of a dispersion of particles and pasty viscous material, including chocolate, comprising at least a first and a second roller set wherein said first roller set has at least two cooperating end rolls with an exit gap inbetween said end rolls and said second roller set is a distributing roller set with at least three distributing rollers and at least one feed in roller for feeding said material into said second roller set, gap adjusting means connected to said first roller set for adjusting said exit gap, at least one thickness sensor for measuring an actual layer thickness of said material at said distribution roller set, comparator means connected to said at least one thickness sensor for receiving at least one first signal representing said actual layer thickness, said comparator means is receiving a second signal representing a given layer thickness and compares at least said first with said second signal and creates an comparator output signal, control means connected to said comparator means and to said gap-adjusting means for controlling said adjusting of said gap, a threshold switching means connected to said comparator means and to said control means for activating and deactivating said adjusting of said gap according to the actual level of said comparator output signal.

* * * * *